Patented Sept. 13, 1949

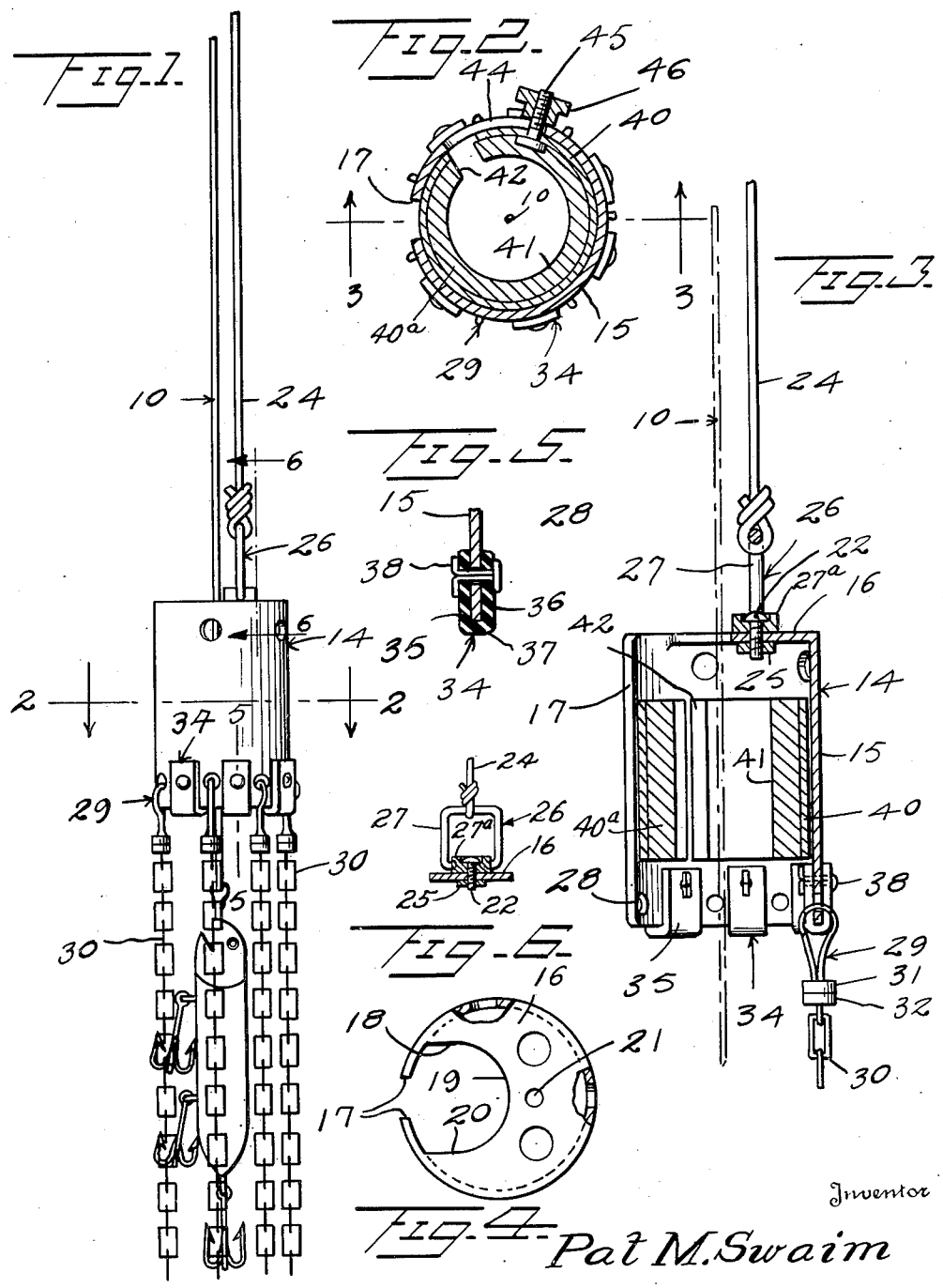

2,482,037

UNITED STATES PATENT OFFICE 2,482,037

ARTIFICIAL FISHING LURE RETRIEVER

Pat M. Swaim, Fort Smith, Ark.

Application September 15, 1947, Serial No. 773,950

4 Claims. (Cl. 43—30)

This invention relates to an improved artificial fishing bait retriever for disengaging the hook of a fish lure when it becomes entangled when submerged.

It is an object of this invention to provide an improved artificial fishing bait retriever of the kind to be more specifically described hereinafter, which is so constructed and arranged as to be readily mounted or disposed about the fishing line that it may be slid thereon downwardly to free a lure which has become entangled.

Another object of this invention is to provide an artificial fishing bait retriever of this kind, having an outer shell and an inner body rotatable therein, each formed with elongated openings on one side thereof so that the retriever may be disposed about the fishing line in one position of the rotating body and may be secured thereon by rotating the inner or outer body so that the openings therethrough will be closed.

A further object of this invention is to provide an artificial fishing bait retriever of this kind having chains depending from the lower end thereof, which are provided for loosening the hook or fishing lure from its entanglement and which may become fastened on the hook when it is tangled so that a large force may be exerted on the retriever for loosening the hook.

A still further object of this invention is to provide a retrieving device of this kind having rubber cushions mounted on the lower end thereof so that the retriever will not damage the body of a fishing lure on which the hook is attached.

With the above and other objects in view, my invention consists in the arrangement, combination and details of construction disclosed in the drawings and specifications, and then more particularly pointed out in the appended claims.

In the drawings,

Figure 1 is a side elevation of an artificial fishing bait constructed according to an embodiment of this invention, Figure 2 is a horizontal section taken on the line 2—2 of Figure 1, Figure 3 is a vertical section taken on the line 3—3 of Figure 2, Figure 4 is a top plan view of the outer tubular member removed from the device, Figure 5 is a fragmentary detail section taken on the line 5—5 of Figure 1, and thereafter Figure 6 is a fragmentary sectional view taken on the line 6—6 of Figure 1, showing the details of an element of my invention.

Referring to the drawings, the numeral 10 designates generally a fishing line having a hook or hooks 12 mounted on an artificial lure or minnow 13 at one end thereof, on which this fishing lure retriever is adapted to be engaged.

When the hook or hooks of a fishing lure become entangled with foreign objects, it is frequently necessary to sever the line 10 and lose the hook and lure which have become so entangled.

The retriever 14 of this invention is adapted to be engaged about the line 10 for sliding thereon when the hooks 12 have become entangled for breaking the hook 12 from the entanglement so that the hooks and lure may be recovered. As many fishermen are proud of certain ones of their lures, the use of such a retriever will permit them to recover a lure when it has become entangled during its use.

The artificial fishing bait retriever 14 is formed of a tubular outer member or shell 15 open at the lower end thereof and having a top wall or cover 16 formed thereon. The outer member or shell 15 is formed with a vertically extending slot 17 which extends from the lower to the upper end thereof forming substantially a split ring.

The top wall 16 is formed with an enlarged opening 18 substantially U-shaped in configuration, which communicates with the opening 17. The bight 19 of the U-shaped opening 18 in the top wall 16 is disposed on one side of the axial center of the shell or member 15.

The side walls or arms 20 of the opening 18 engage the side walls of the shell 15 on opposite sides of the edges of the slot 17. An opening 21 is formed through the top wall 16 through which a bolt 22 may be engaged for securing a flexible line or cord 24 to the retriever 14.

A nut 25 is threadably engaged with the bolt 22 on the lower side of the wall 16 and a swivel 26 having a plate 27a is carried by the upper end or shank of the bolt 22 above the wall 16. The swivel 26 is formed with an eye 27 pivotally carried by the plate 27a and in which the cord or supporting member for the retriever is adapted to be engaged as best seen in Figure 6 of the drawing.

The lower edge of the outer member 15 is provided with a plurality of circumferentially disposed openings 28. An eye 29 is adapted to be engaged through every other opening 28 for supporting from the lower edges of the outer member 15 a plurality of chains or other metal flexible members 30.

The eye or hook 29 is formed with a swivel connector 31 on the lower end thereof with which a correlated connecting member 32 fastened to the chain 30 is adapted to be engaged.

The swivel connection between the chains 30 and the lower edge of the outer shell 15 permits the free movement and rotation of the chains 30 as the occasion arises.

Rubber pads 34 are adapted to be secured to the remaining alternate openings 28 through the shell 15. A U-shaped rubber member 34 is engaged over the lower edge of the member 15 with one arm of the cushion as 35 engaging the inner side of the member 15 and the other arm as 36 disposed on the outer side of the shell 15.

The bight 37 of the cushion 34 covers the lower edge of the tubular member 15 so that as the retriever 14 is lowered along a fishing line 10 the rubber cushions 34 will engage the fishing lure to prevent damage to the lure by the metal retriever 14.

Pins or rivets 38 are adapted to be extended through the arms 36 and 35 and through alternate openings 28 for securing the cushions 34 on the retriever 14. A central body 40 having an inner lead liner 40a is rotatably disposed within the outer member 15. The central body 40 is substantially cylindrical in shape being of a length considerably shorter than the length of the outer member 15. The member 40a is formed with a central or axial bore 41 extending therethrough.

A radially extending slot 42 is formed in the cylindrical inner member 40 and liner 40a communicating with the bore 41 and opening along one side edge of the body 40.

The slot 42 opens through the side wall of the inner member 40 and through the upper ends thereof. In one rotating position of the inner member 40 relative to the outer member 15 the slot 42 is adapted to be aligned with the slot 17 so that the fishing line may be disposed in the bore 41. In this manner the fishing lure retriever 14 may be placed about the fishing line 10 at any position along the length of the line.

A circumferentially disposed horizontal slot 44 is formed in the outer member 14 circumferentially spaced from the slot 17 therein. A bolt 45 is fixed to or carried by the inner member 40 and is adapted to extend through the slot 44 of the outer member 15.

A nut 46 is threadably engaged with the outer end of the bolt 45 and is formed of such a diameter that no part of the nut 46 will engage in the slot 44. By tightening the nut 46 on the bolt 45, the outer member 15 is clamped between the inner member 40 and the nut 46 for holding the members against relative rotation.

In the use and operation of this artificial fishing bait retriever 14, the nut 46 is initially loosened and the inner member 40 is rotated relative to the outer member 15 to align the slots 17 and 42. The retriever 14 may be then disposed about a fishing line 10 and the outer member 15 is rotated relative to the inner member 40 so that the openings 17 and 42 are not in registry with the fishing line 10 disposed within the bore 41.

The nut 46 may be then tightened for securing the members 15 and 40 against inadvertent rotation. The retriever 14 is then allowed to slide freely down the length of the line 10 where it will bump against the fishing lure or hook at the lower end of the line.

As the rubber cushions 34 are provided on the lower end of the retriever 14, the retriever will not scratch or otherwise mar the fishing lure. In many instances the initial downward force exerted by the retriever 14 on the line 10 or on the hook 12 will force the hook out of engagement with the objects with which it has become entangled. If this initial contact of the retriever does not loosen the hook, the retriever may be moved up and down near the end of the line so that the chains 30 will be waved about in close proximity to and in contact with the hook 12.

As there are a large number of chains 30, the motion of the retriever 14 in this manner tends to cause the links of the chain or at least one link of one chain to engage over the barb of a hook. When the link of a chain has become engaged with a hook 12, a large force may be exerted on the cord or flexible member 24 from which the retriever 14 is supported for pulling the hook free without breaking the line 10. In this manner the hook or hooks and the fishing lure may be recovered.

It is desired to form the slot 42 about one-quarter of an inch across while the bore 41 is to be about seven-eighths of an inch in diameter. Very often a fisherman puts a weight or sinker on the fishing line to cause the fishing bait or lure to run deep in the water where the big fish often stay. By forming the bore 41 this size the retriever will pass or slide over the weight or sinker and go on down to engage with the tangled lure. The sinker is often put on the fishing line about eighteen inches from the end of the line where the lure is attached to the end.

I do not mean to confine myself to the exact details of construction herein disclosed, but claim all variations falling within the purview of the appended claims.

Having thus described my invention, what I claim is:

1. An improved retriever for a fishing lure comprising a tubular member having a longitudinally extending slot along one side thereof, an end wall on one end of said tubular member formed with an opening communicating with said slot, a cylindrical member rotatable in said tubular member formed with a bore therethrough and a slot through one wall thereof communicating with said bore, the slots of said tubular member and said cylindrical member registering in one position thereof for engaging said retriever over a fishing line, the opening of said end wall registering with said bore whereby said retriever may be loosely disposed about said line, correlated means carried by said tubular member and said cylindrical member for securing said members in selected rotated position relative to each other, and flexible members depending from said tubular member for engagement over and with a hook on the fishing line.

2. An improved retriever of the kind described comprising a tubular outer member, a cylindrical inner member rotatable in said outer member, said inner member formed with a central bore longitudinally therethrough, said members formed with longitudinal slots through a wall thereof registrable in one rotated position of said inner member for admitting a fishing line into said bore, a top wall on said tubular outer member formed with an opening communicating with the slot of said tubular member and registering over said bore, locking means carried by said members for securing said members in selected rotated position, and flexible members depending from the lower edge of said retriever for engagement over and with a hook on the fishing line.

3. A fishing lure retriever comprising a tubular outer member, a rotatable inner member in said outer member, said members formed with longitudinal slots through one wall thereof registerable in one rotated position of said inner member for admitting a fishing line into a central bore through said inner member, a threaded bolt on said inner member engaging through a segmental circumferentially disposed slot through said outer member, a nut engaging said bolt for securing said members together in selected rotated position, a flexible supporting member for said retriever, swivel means securing said flexible member on said retriever, resilient cushion means on the lower edge of outer member, and metallic flexible members depending from said outer member for engagement with a hook on the fishing line.

4. A retriever for a fishing lure comprising an inner cylindrical member, an outer tubular member rotatable about said inner member, said members having means for admitting a fishing line through the side walls thereof in one rotated position of said outer member, said outer member confining a line in said inner member in other positions thereof, means securing said members against rotation in selected rotated positions, metallic flexible members depending from the lower end of said retriever and resilient cushion members on the lower end of one of said members.

PAT M. SWAIM.

REFERENCES CITED

The following references are of record in the file of this patent:

UNITED STATES PATENTS

| Number | Name | Date |
|---|---|---|
| 1,037,378 | Ward | Sept. 3, 1912 |
| 2,175,135 | Sorenson et al. | Oct. 3, 1935 |
| 2,205,377 | Miller | June 18, 1940 |
| 2,353,357 | Paulick | July 11, 1944 |